United States Patent
Sato et al.

(10) Patent No.: US 9,950,740 B2
(45) Date of Patent: Apr. 24, 2018

(54) AUTOMATIC DRIVING CONTROL DEVICE

(71) Applicant: TOYOTA JIDOSHA KABUSHIKI KAISHA, Toyota-shi, Aichi (JP)

(72) Inventors: Jun Sato, Susono (JP); Masaki Matsunaga, Odawara (JP); Yuichi Kumai, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/186,606

(22) Filed: Jun. 20, 2016

(65) Prior Publication Data

US 2017/0003683 A1    Jan. 5, 2017

(30) Foreign Application Priority Data

Jul. 1, 2015 (JP) .................................. 2015-132772

(51) Int. Cl.
*B62D 15/02* (2006.01)

(52) U.S. Cl.
CPC ......... *B62D 15/021* (2013.01); *B62D 15/025* (2013.01)

(58) Field of Classification Search
CPC .... B62D 15/025; B62D 1/286; B62D 15/021; G05D 1/0061; B60W 30/10; B60W 30/12
See application file for complete search history.

(56) References Cited

U.S. PATENT DOCUMENTS

| 6,473,678 B1 * | 10/2002 | Satoh | B62D 15/025 180/168 |
| 8,670,891 B1 | 3/2014 | Szybalski et al. | |
| 2005/0182539 A1 * | 8/2005 | Maass | B60Q 9/008 701/41 |
| 2007/0233343 A1 * | 10/2007 | Saito | B62D 1/28 701/41 |

(Continued)

FOREIGN PATENT DOCUMENTS

| JP | 07023370 A * | 1/1995 |
| JP | 9-309453 A | 12/1997 |

(Continued)

OTHER PUBLICATIONS

JPO machine translation of JP 2000-198458 (original JP document published Jul. 18, 2000).*

(Continued)

*Primary Examiner* — Behrang Badii
*Assistant Examiner* — David A Testardi
(74) *Attorney, Agent, or Firm* — Sughrue Mion, PLLC

(57) ABSTRACT

An automatic driving control device performs an automatic driving control for causing a vehicle to travel along a reference travel trajectory set in a lane in advance. The automatic driving control device reflects the steering by the driver during the automatic driving control in the travelling of the vehicle in a case where the steering by the driver is detected during the automatic driving control by the steering detection unit and when a position of the vehicle in the lane width direction is included in an allowance range, and alerts (Continued)

the driver to the travelling of the vehicle in a case where the steering by the driver is detected and in a case where it is determined that the position of the vehicle in the lane width direction is included in the second range.

2 Claims, 14 Drawing Sheets

(56) References Cited

U.S. PATENT DOCUMENTS

| | | | | |
|---|---|---|---|---|
| 2009/0171533 A1* | 7/2009 | Kataoka | ................ | B60W 30/12 701/41 |
| 2010/0324797 A1* | 12/2010 | Fritz | .................... | B62D 15/026 701/96 |
| 2011/0015850 A1* | 1/2011 | Tange | .................. | B60W 30/12 701/116 |
| 2011/0316685 A1* | 12/2011 | Kim | ..................... | B60W 30/12 340/435 |
| 2016/0052547 A1* | 2/2016 | Kashiwai | .............. | B60W 30/10 701/41 |
| 2016/0207538 A1 | 7/2016 | Urano et al. | | |
| 2016/0209841 A1 | 7/2016 | Yamaoka et al. | | |

FOREIGN PATENT DOCUMENTS

| | | | | |
|---|---|---|---|---|
| JP | 2000198458 A | * | 7/2000 | |
| JP | 2001048035 A | * | 2/2001 | |
| JP | 2001171449 A | * | 6/2001 | |
| JP | 2003-26027 A | | 1/2003 | |
| JP | 2004231096 A | * | 8/2004 | |
| JP | 2009208602 A | * | 9/2009 | |
| JP | 2010023756 A | * | 2/2010 | |
| JP | 2012185562 A | * | 9/2012 | |
| JP | 2016-132352 A | | 7/2016 | |
| JP | 2016-133985 A | | 7/2016 | |
| WO | WO 2014/178445 A1 | * | 11/2014 | |

OTHER PUBLICATIONS

JPO machine translation of JP 07-023370 (original JP document published Jan. 24, 1995).*

* cited by examiner

AUTOMATIC DRIVING CONTROL DEVICE

TECHNICAL FIELD

The present invention relates to an automatic driving control device that performs an automatic driving control of a vehicle.

BACKGROUND

In the related art, as a device that performs an automatic driving control of a vehicle, for example, as disclosed in U.S. Pat. No. 8,670,891, a device is known, the automatic driving control is stopped when at least one operation of a brake, a steering wheel, and an accelerator is detected during the automatic driving control of the vehicle and an amount of the operation exceeds a threshold value.

SUMMARY

Incidentally, during the automatic driving control of the vehicle, the vehicle is controlled so as to travel along a reference trajectory included in a travel plan generated in advance. However, there is a case where a driver wants to change a travelling position of the vehicle in a lane width direction in a lane. For example, when a large vehicle is travelling in a neighboring lane, the driver may want to cause the vehicle to travel a little away from the large vehicle. In this case, it is considered that the vehicle can be allowed to travel away from the reference trajectory within a certain allowance range from the reference trajectory in accordance with the steering by the driver. On the other hand, if the steering by the driver is reflected in the travelling of the vehicle without any limitation, there is a risk that the vehicle is too much away from the reference trajectory.

Therefore, in this technical field, it is desired to develop an automatic driving control device that can alert the driver to the travelling of the vehicle while realizing the travelling of the vehicle along the intention of the driver even during the automatic driving control.

That is, according to an aspect of the present invention, an automatic driving control device is configured to perform an automatic driving control for causing a vehicle to travel along a reference travel trajectory set in a lane in advance. The device is configure to include: a steering detection unit configured to detect a steering by a driver of the vehicle during the automatic driving control, a range setting unit configured to set an allowance range that includes the reference travel trajectory in the lane as a range in a lane width direction of the lane, and to set a first range that includes the reference travel trajectory in the allowance range and a second range at both the right and left sides of the first range; an automatic driving control unit configured to execute the automatic driving control and to apply the steering by the driver during the automatic driving control in the travelling of the vehicle when the steering by the driver is detected by the steering detection unit and a position of the vehicle in the lane width direction is included in the allowance range; a position determination unit configured to determine whether or not the position of the vehicle in the lane width direction is included in the second range when the steering by the driver is detected by the steering detection unit; and an alerting unit configured to alert the driver to the travelling of the vehicle when it is determined by the position determination unit that the position of the vehicle in the lane width direction is included in the second range.

According to this automatic driving control device, even during the automatic driving control, in a case where the position of the vehicle in the lane width direction is included in the allowance range, the steering by the driver is reflected in the travelling of the vehicle. Therefore, the travelling of the vehicle along the intention of the driver can be realized, and when the vehicle is largely away from the reference travel trajectory and reaches the second range, it is possible to alert the driver to the travelling of the vehicle.

The automatic driving control device in the aspect of the present invention may further include a steering determination unit configured to determine whether or not an amount of steering by the driver detected by the steering detection unit decreases to an amount smaller than the steering amount threshold value from an amount equal to or greater than the steering amount threshold value. The position determination unit may be configured to determine whether or not a position of the vehicle in the lane width direction is included in the first range, and the automatic driving control is executed such that the position of the vehicle in the lane width direction is maintained when it is determined by the steering determination unit that the amount of steering by the driver decreases to the amount smaller than the steering amount threshold value from the amount equal to or greater than the steering amount threshold value and it is determined by the position determination unit that the position of the vehicle in the lane width direction is included in the first range. In this automatic driving control device, the automatic driving control is executed such that the position of the vehicle in the lane width direction is maintained when the amount of steering by the driver becomes smaller than the steering amount threshold value after the amount of steering by the driver becomes equal to or greater than the steering amount threshold value and the position of the vehicle in the lane width direction is changed during the automatic driving control and the position of the vehicle in the lane width direction is included in the first range. Therefore, it is possible to cause the vehicle to travel on the position of the driver's intention.

The automatic driving control device in the aspect of the present invention may further include a vehicle speed detection unit configured to detect a vehicle speed of the vehicle. The range setting unit may be configured to set the allowance range, the first range, and the second range based on the vehicle speed of the vehicle, and may set the allowance range, the first range, and the second range to be wider in the lane as the vehicle speed becomes lower. In the automatic driving control device, the allowance range, the first range, and the second range are set to be wider in the lane as the vehicle speed becomes lower. Therefore, it is possible to widen the range of reflecting the steering by the driver in the travelling of the vehicle compared to the case where the allowance range, the first range, and the second range are fixed ranges while considering the vehicle speed of the vehicle.

According to the present invention, in a case where the position of the vehicle in the lane width direction is included in the allowance range even during the automatic driving control, the steering by the driver can be reflected in the travelling of the vehicle. Therefore, travelling of the vehicle along the intention of the driver can be realized, and in a case where the vehicle is significantly away from the reference travel trajectory and reaches the second range, it is possible to alert the driver to the travelling of the vehicle.

DETAILED DESCRIPTION

Hereinafter, an embodiment of the present invention will be described with reference to the drawings. In the description below, the same reference signs will be given to the same or similar elements and the descriptions thereof will not be repeated.

Figure 1:
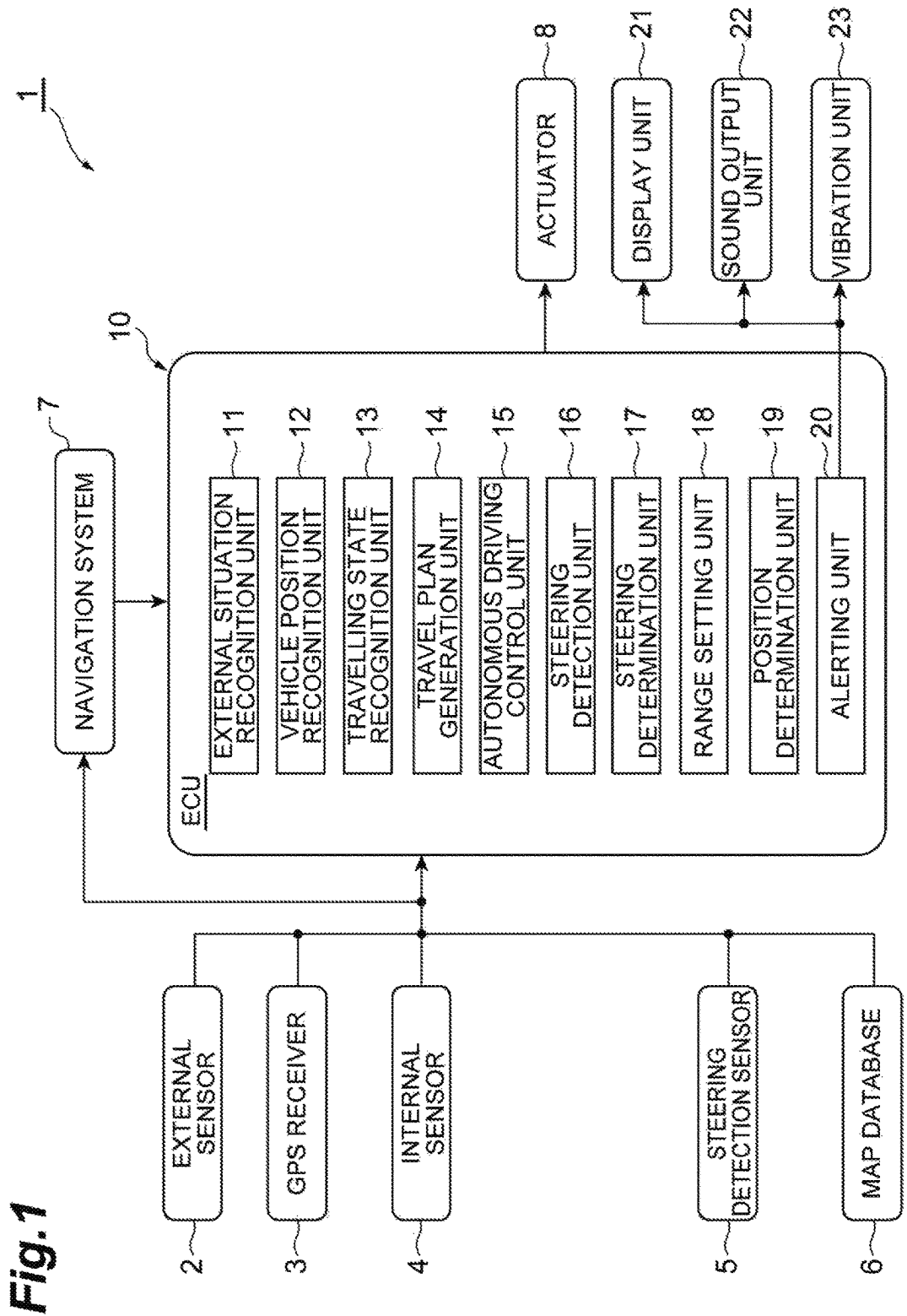
FIG. 1 is a block diagram illustrating a configuration overview of an automatic driving control device in an embodiment of the present invention.

FIG. 1 is a block diagram illustrating a configuration overview of an automatic driving control device 1 in an embodiment of the present invention. In FIG. 1, the automatic driving control device 1 in the present embodiment is a device that is mounted on a vehicle and performs an automatic driving control of the vehicle. When steering is performed by a driver during the automatic driving control of the vehicle, the automatic driving control device 1 reflects the steering by the driver in the travelling of the vehicle under a predetermined condition. In addition, the automatic driving control device 1 has a function of performing switching of the driving mode to the manual driving from the automatic driving under a predetermined condition. The automatic driving means a driving state in which the automatic driving control device 1 causes the vehicle to autonomously travel. The manual driving means a driving state in which the driver performs the driving of the vehicle by a manual driving operation.

The automatic driving control device 1 includes an electronic control unit (ECU) 10. The ECU 10 is an electronic control unit that performs the control of the travelling of the vehicle, and is mainly configured of a computer that includes a central processing unit (CPU), a read only memory (ROM), and a random access memory (RAM). Details of the ECU 10 will be described below.

An external sensor 2, a global positioning system (GPS) receiver 3, an internal sensor 4, a steering detection sensor 5, a map database 6, a navigation system 7, an actuator 8, a display unit 21, a sound output unit 22 and a vibration unit 23 are respectively connected to the ECU 10.

The external sensor 2 is a detection device that detects an external situation which is surroundings information of the vehicle. The external sensor 2 includes at least one of a camera, radar, and a laser imaging detection and ranging (LIDAR).

The camera is an imaging device that images the external situation of the vehicle. The camera is, for example, provided on the inside of windshield of the vehicle. The camera may be a monocular camera or may be a stereo camera. The stereo camera has two imaging units that are arranged so as to reproduce a binocular parallax. The image information from the stereo camera includes information of the depth direction. In a case of using the stereo camera, the camera can be used as an object detection unit that detects an object including a preceding vehicle or an obstacle. In addition, the camera can be used as a sensor that detects lane lines of a lane in which the vehicle travels.

The radar is detects an obstacle outside of the vehicle using a radio wave (for example, a millimeter wave). The radar detects the obstacle by transmitting the radio wave to the surroundings of the vehicle and receiving the radio wave reflected from the obstacle. The radar outputs the detected obstacle information to the ECU 10.

The LIDAR detects an obstacle outside of the vehicle using light. The LIDAR transmits the light to the surroundings of the vehicle, measures the distance to the reflection point by receiving the light reflected from the obstacle, and then, detects the obstacle. The LIDAR outputs the detected object information to the ECU 10. The camera, the LIDAR, the radar, and a communication device are not necessarily prepared in an overlapping manner.

The GPS receiver 3 receives signals from three or more GPS satellites and measures a position of the vehicle (for example, the latitude and the longitude of the vehicle). The GPS receiver 3 outputs the measured position information of the vehicle to the ECU 10. Instead of the GPS receiver 3, another means for specifying the latitude and the longitude of the vehicle may be used. In addition, it is preferable for the GPS receiver 3 to have a function of measuring the orientation of the vehicle for matching the detection result of a sensor with the map information described below.

The internal sensor 4 is a detection device that detects the travelling state of a vehicle. The internal sensor 4 includes at least one of a vehicle speed sensor, an acceleration sensor, and a yaw rate sensor as a sensor for detecting the travelling of the vehicle. The vehicle speed sensor is a detector that detects the vehicle speed. As the vehicle speed sensor, for example, a wheel speed sensor is used, which is provided on vehicle wheels of the vehicle or a member such as a drive shaft rotating integrally with the vehicle wheels and detects a rotational speed of the vehicle wheels. The vehicle speed sensor outputs the detected vehicle speed information (for example, wheel speed information) to the ECU 10. The acceleration sensor is a detection device that detects an acceleration of the vehicle. The acceleration sensor includes, for example, a longitudinal acceleration sensor that detects acceleration in the longitudinal direction of the vehicle and a lateral acceleration sensor that detects a lateral acceleration of the vehicle. The acceleration sensor outputs, for example, the detected acceleration information to the ECU 10. The yaw rate sensor is a detection device that detects a yaw rate (rotational angular velocity) around the vertical axis of the center of gravity of the vehicle. As the yaw rate sensor, for example, a gyro sensor can be used. The yaw rate sensor outputs the detected yaw rate information to the ECU 10.

The steering detection sensor 5 is a sensor that detects an amount of the steering performed by the driver. The amount of steering is a steering angle or a steering torque of the steering wheel operated by the driver. For example, a steering angle sensor or a steering torque sensor is used as the steering detection sensor 5. The steering detection sensor 5 outputs the detected signal to the ECU 10.

The map database 6 is a database in which map information is included. The map database 6 is formed, for example, in a hard disk drive (HDD) mounted on the vehicle. In the map information, for example, position information of roads, information on road types (for example, the number of lanes and the types of lanes), and position information of intersections and branch points are included. The map database 6 may be stored in a computer in the facility such as an information processing center which is capable of communicating with the vehicle.

The navigation system 7 is a device that performs guidance to a destination set by the driver of the vehicle for the driver of the vehicle. The navigation system 7 calculates a travelling route of the vehicle based on the position information of the vehicle measured by the GPS receiver 3 and the map information in the map database 6. The route may be a route on which a preferable lane is specified in the road section of multi-lane. The navigation system 7 calculates, for example, a target route from the position of the vehicle to the destination and performs notification on the driver of the target route by displaying on a display or outputting a sound from a speaker described below. The navigation system 7, for example, outputs the target route information of the vehicle to the ECU 10. The navigation system 7 may be stored in the computer in the facility such as an information processing center which is capable of communicating with the vehicle.

The actuator 8 is a device that executes the automatic driving control of the vehicle. The actuator 8 includes at least a throttle actuator, a brake actuator, and a steering actuator. The throttle actuator controls a supply amount (for example, throttle opening degree) of air to an engine according to the control signal from the ECU 10, and controls the driving power of the vehicle. In a case where the vehicle is a hybrid vehicle or an electric vehicle, the driving power is controlled by the control signal from the ECU 10 being input to a motor which is a source of the driving force without the throttle actuator.

The brake actuator controls a brake system according to the control signal from the ECU 10 and controls the braking power given to the wheels of the vehicle. For example, a hydraulic brake system can be used as the brake system. The steering actuator controls the driving of an assist motor that controls steering torque in the electric power steering system according to the control signal from the ECU 10. In this way, the steering actuator controls the steering torque of the vehicle.

The display unit 21 functions as a device for alerting the driver to the travelling of the vehicle through the visual. For example, when the steering by the driver is detected during the automatic driving control and the steering is reflected in the travelling of the vehicle, the display unit 21 performs the displaying for alerting the driver in accordance with the position of the vehicle in the lane width direction. As the display unit 21, for example, a display, a monitor, and an indicator are used.

The sound output unit 22 functions as a device for alerting the driver to the travelling of the vehicle through the hearing. For example, when the steering by the driver is detected during the automatic driving control and the steering is reflected in the travelling of the vehicle, the sound output unit 22 outputs a sound for alerting the driver in accordance with the position of the vehicle in the lane width direction. As the sound output unit 22, for example, a speaker and a buzzer are used.

The vibration unit 23 functions as a device for alerting the driver to the travelling of the vehicle through a touching sense. For example, when the steering by the driver is detected during the automatic driving control and the steering is reflected in the travelling of the vehicle, the vibration unit 23 emits a vibration for alerting the driver in accordance with the position of the vehicle in the lane width direction. As the vibration unit 23, for example, a vibrator provided on a steering wheel or a seat is used.

The ECU 10 includes an external situation recognition unit 11, a vehicle position recognition unit 12, a travelling state recognition unit 13, a travel plan generation unit 14, an automatic driving control unit 15, a steering detection unit 16, a steering determination unit 17, a range setting unit 18, a position determination unit 19, and an alerting unit 20.

The external situation recognition unit 11 recognizes the external situations of the vehicle based on the detection result (for example, the image information from the camera, the obstacle information from the radar, the obstacle information from the LIDAR, or the like) of the external sensor 2. The external situation includes, for example, the width of the road, the shape of the road, a situation of another vehicle around the vehicle, and a situation of the obstacle around the vehicle.

The vehicle position recognition unit 12 recognizes the position of the vehicle on the map based on the position of the vehicle received by the GPS receiver 3 and the map information in the map database 6. In addition, the vehicle position recognition unit 12 recognizes the lane lines using the image information from the camera of the external sensor 2, and then, recognizes the position of the vehicle with respect to the lane. The vehicle position recognition unit 12 may recognized a lateral distance between the vehicle and the lane line in the lane width direction using the image information from the camera of the external sensor 2 by a known method.

The travelling state recognition unit 13 recognizes a travelling state of the vehicle based on the detection result (for example, the vehicle speed information from the vehicle speed sensor, the acceleration information from the acceleration sensor, the yaw rate information from the yaw rate sensor, and the like) of the internal sensor 4. For example, the vehicle speed, the acceleration, the yaw rate, and the like are included in the travelling state of the vehicle. That is, travelling state recognition unit 13 functions as a vehicle speed detection unit that detects the vehicle speed of the vehicle. In addition, the travelling state recognition unit 13 may recognize a travelling direction of the vehicle based on a temporal change of the position of the vehicle.

The travel plan generation unit 14 generates a long term travel plan based on a destination set in advance, the vehicle position recognized by the vehicle position recognition unit 12, and the map information. The destination set in advance may be set by the driver or may be proposed by the navigation system 7 using a known method. The long term travel plan is, for example, a travel plan from the current position of the vehicle to the destination. The long term travel plan includes a planned speed pattern relating to the speed according to the reference travel trajectory relating to the travelling position of the vehicle and the position of the vehicle. The reference travel trajectory is, for example, a trajectory on which the vehicle travels along a target route calculated by the navigation system 7. The reference travel trajectory is a trajectory that becomes the reference to the travelling of the vehicle, and is set, for example, such that the center positions of the lane are connected. The reference travel trajectory may be set so as to pass through the positions shifted to the right or left from the center positions of the lane. The planned speed pattern is data formed of a target vehicle speed set for each of the predetermined intervals (for example, one meter) on the reference travel trajectory. The planned speed pattern is set, for example, on points before entering the temporary stop line and a curve such that the vehicle speed can sufficiently be reduced.

The travel plan generation unit 14 generates a short term travel plan based on the external situation which is the information surrounding the vehicle and the travelling state of the vehicle. The short term travel plan is, for example, a travel plan for the travelling of the vehicle to a time up to a few or a few tens of seconds ahead from the current time point. A target travel path that is a trajectory on which the vehicle actually travels and a target speed pattern which is an actual target speed of the vehicle are included in the short term travel plan. For example, the reference travel trajectory in the long term travel plan is adopted as an initial value of the target travel path. Similarly, for example, the planned speed pattern in the long term travel plan is adopted as an initial value of the target speed pattern. For example, when an obstacle is detected in front of the vehicle, the travel plan generation unit 14 generates the short term travel plan (the target travel path and the target speed pattern) so as to avoid the obstacle. In this case, the trajectory of the target travel path is different from the reference travel trajectory. Similarly, in this case, the data of the target speed pattern is different from the data of the planned speed pattern.

The automatic driving control unit 15 executes the automatic driving control such that the vehicle travels along the travel plan generated by the travel plan generation unit 14. For example, the automatic driving control unit 15 executes the automatic driving control such that the vehicle travels in accordance with the target travel path set with the reference travel trajectory as a reference. That is, the automatic driving control unit 15 outputs a control signal to the actuator 8 such that the vehicle travels in accordance with the target travel path, and then, executes the steering control, acceleration control, and brake control. This automatic driving control unit 15 starts the automatic driving control according to a starting condition such as an operation of a start button for starting the automatic driving control by the driver. In addition, the automatic driving control unit 15 ends the automatic driving control according to an operation of an ending button for ending the automatic driving control by the driver.

When the steering by the driver is detected during the automatic driving control and the position of the vehicle in the lane width direction is included in the allowance range set in advance, the automatic driving control unit 15 applies (reflects) the steering by the driver in the travelling of the vehicle and continues the automatic driving control. On the other hand, when the steering by the driver is detected during the automatic driving control and the position of the vehicle in the lane width direction is not included in the allowance range set in advance, the automatic driving control unit 15 switches the driving mode to the manual driving from the automatic driving and ends the automatic driving control. In addition, when the steering by the driver is detected during the automatic driving control and the amount of steering decreases to an amount smaller than the steering amount threshold value from the amount equal to or greater than the steering amount threshold value and it is determined that the position of the vehicle in the lane width direction is included in a first range, the automatic driving control unit 15 executes the automatic driving control such that the position (the vehicle position at the time of ending the steering) of the vehicle in the lane width direction is maintained. The first range is a range set within the allowance range. Details of the first range will be described below.

The steering detection unit 16 detects the steering by the driver of the vehicle during the automatic driving control. For example, the steering detection unit 16 detects the presence or absence of the steering by the driver and the amount of steering by the driver during the automatic driving control based on, for example, the detected signal from the steering detection sensor 5. For example, a steering angle or a steering torque of the steering wheel is used as the amount of steering.

When the steering by the driver of the vehicle is present during the automatic driving control, the steering determination unit 17 determines whether or not the amount of steering decreases to an amount smaller than the steering amount threshold value from the amount equal to or greater than the steering amount threshold value. For example, a set value set in the ECU 10 in advance is used as the steering amount threshold value.

Figure 2:
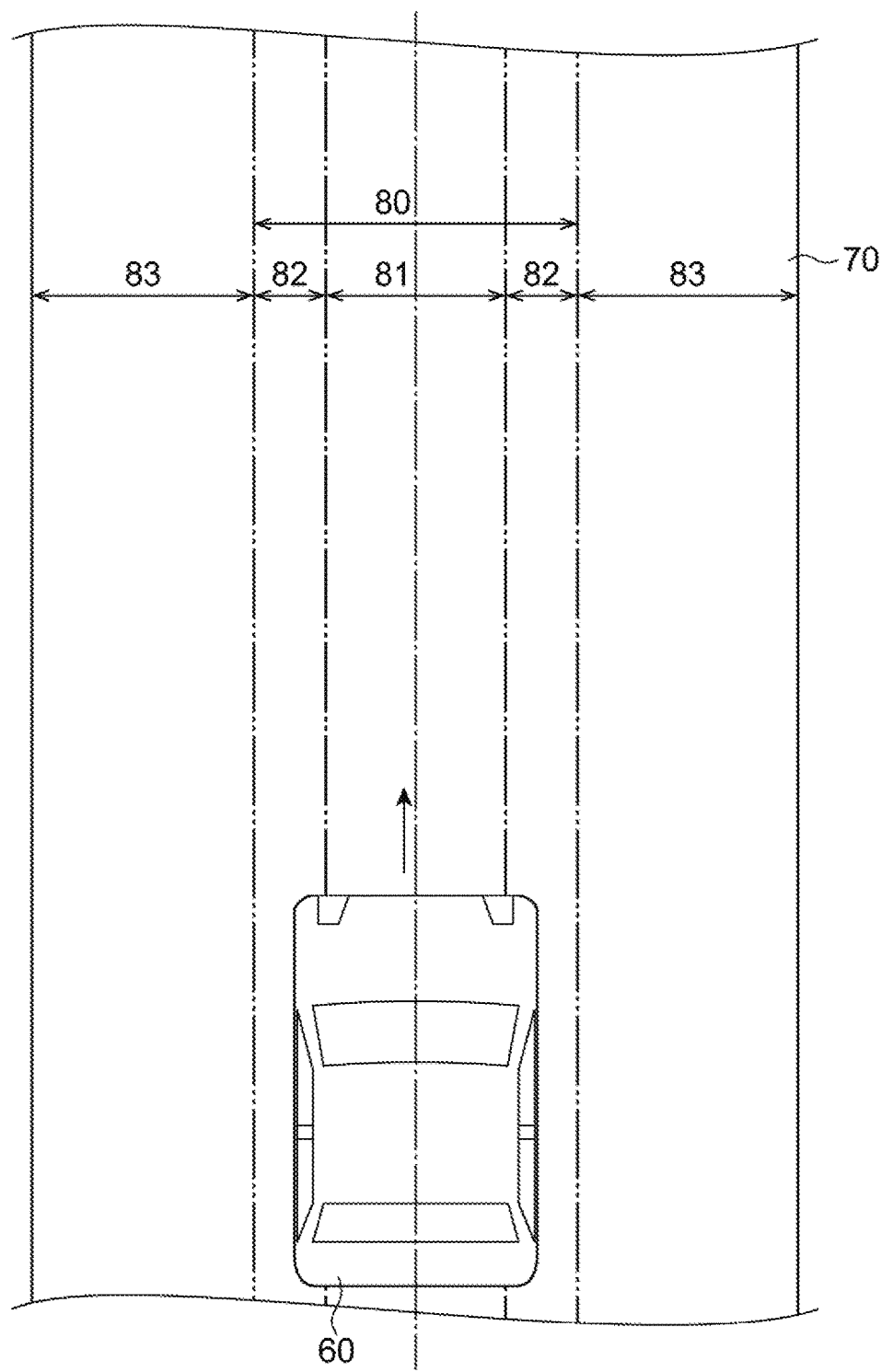
FIG. 2 is a diagram for describing a range setting in the automatic driving control device in FIG. 1.
Figure 3:
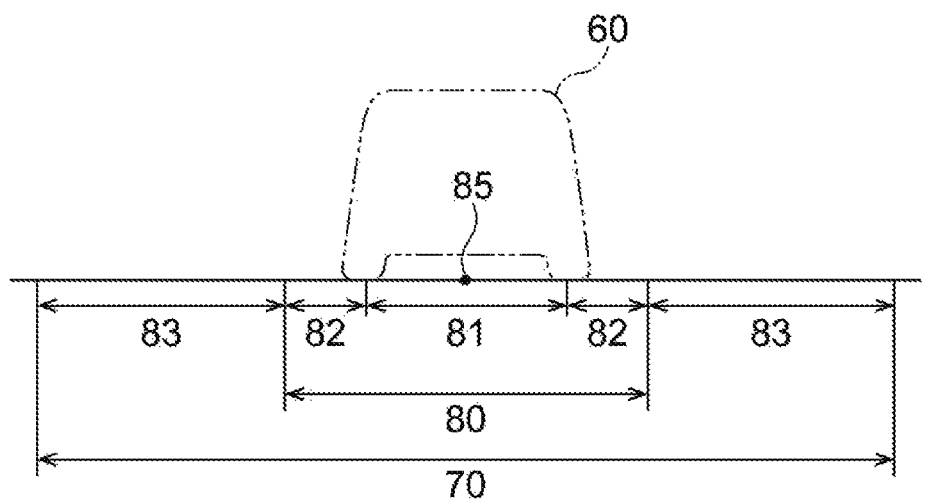
FIG. 3 is a diagram for describing a range setting in the automatic driving control device in FIG. 1.

The range setting unit 18 sets the allowance range, the first range and a second range in the travelling lane of the vehicle. For example, the range setting unit 18 sets the allowance range, the first range and the second range based on the reference travel trajectory and the information in the map database 6. The allowance range is a range in the lane width direction and is set as a range in the lane in which the reference travel trajectory is included. For example, as illustrated in FIGS. 2 and 3, as a range including a reference travel trajectory 85, allowance range 80 is set in a lane 70 in which the vehicle travels. In FIGS. 2 and 3, the reference travel trajectory 85 is set on the center position of the lane 70, and thus, a vehicle 60 travels through the center position of the lane 70. The allowance range 80 is range where the steering by the driver is allowed during the automatic driving control of the vehicle 60, and is set as a range where the automatic driving control is continued even in a case where the steering is performed by the driver. A first range 81 and a second range 82 are set in the allowance range 80. That is, in the allowance range 80, the first range 81 is set on the position including the reference travel trajectory 85, and the second range 82 is set on both the right and left sides of the first range 81. In addition, a third range 83 is set on an end portion side of the lane 70 of the second range 82.

In FIG. 1, when the steering by the driver is detected during the automatic driving control, the position determination unit 19 determines whether or not the position of the vehicle 60 in the lane width direction is within the allowance range 80. Then, when it is determined that the position of the vehicle 60 in the lane width direction is within the allowance range 80, the position determination unit 19 determines whether or not the position of the vehicle 60 in the lane width direction is within the second range 82. In addition, when the steering by the driver is detected during the automatic driving control, the position determination unit 19 determines whether or not the position of the vehicle 60 in the lane width direction is included in the first range 81. For example, the position determination unit 19 determines whether or not the position of the vehicle 60 in the lane width direction is included in the allowance range 80, whether or not included in the first range 81, and whether or included in the second range 82 based on the set information of the allowance range 80, the first range 81, and the second range 82 set by the range setting unit 18 and the vehicle position information in the vehicle position recognition unit 12. The position of the vehicle 60 is determined based on, for example, the center position of the vehicle. That is, when the center position of the vehicle 60 is included in the first range 81, it is determined that the position of the vehicle 60 is included in the first range 81.

When the steering is performed by the driver during the automatic driving control and the position of the vehicle in the lane width direction is included in the second range due to the steering, the alerting unit 20 alerts the driver to the travelling of the vehicle. That is, when the position of the vehicle in the lane width direction is in the second range due to the steering by the driver during the automatic driving control, the alerting unit 20 outputs the control signal to the display unit 21, the sound output unit 22, and the vibration unit 23 and causes the display unit 21, the sound output unit 22, and the vibration unit 23 to operate to alert the driver to the travelling of the vehicle. At this time, all of the display unit 21, the sound output unit 22, and the vibration unit 23 may be caused to operate, or a part thereof may be caused to operate.

The external situation recognition unit 11, the vehicle position recognition unit 12, the travelling state recognition unit 13, the travel plan generation unit 14, the automatic driving control unit 15, the steering detection unit 16, the steering determination unit 17, the range setting unit 18, the position determination unit 19 and the alerting unit 20 may be configured by inducing software or a program that realizes the functions of those units to the ECU 10. In addition, all or a part of those units may be configured of another electronic control unit.

Next, operations of the automatic driving control device 1 in the present embodiment will be described.

Figure 4A:
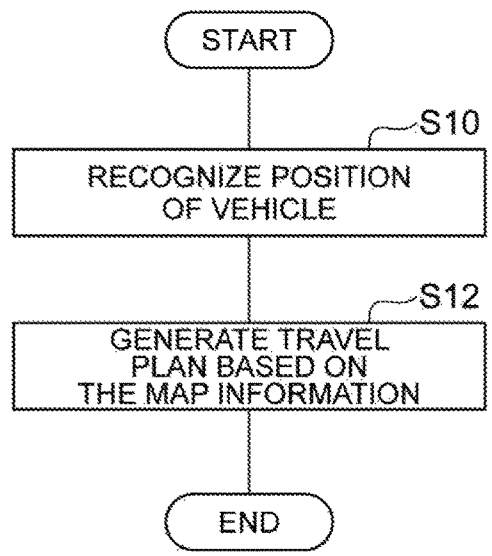
FIG. 4A is flowchart illustrating travel plan generation processing in the automatic driving control device in FIG. 1.

In the travel plan generation processing in FIG. 4A, firstly, as illustrated in STEP S10 (hereinafter, simply referred to as "S10", similar to other STEPs S), vehicle position recognition processing is performed. This recognition processing is processing that recognizes the position of the vehicle. For example, the vehicle position recognition unit 12 recognizes the position of the vehicle on the map based on the position information of the vehicle received by the GPS receiver 3 and the map information in the map database 6.

Then, the process proceeds to S12, and travel plan generation processing based on the map information is performed. The travel plan generation processing is processing that generates the long term travel plan of the vehicle from the current position to the destination of the vehicle. For example, the travel plan generation unit 14 generates the long term travel plan including the reference travel trajectory and the planned speed pattern based on the map information using the destination set in advance and the vehicle position recognized in S10. When the processing in S12 ends, a series of control processing tasks in FIG. 4A ends.

Figure 4B:
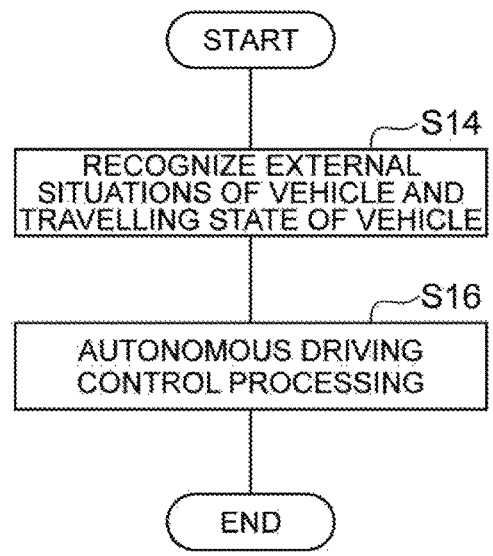
FIG. 4B is flowchart illustrating automatic driving control processing in the automatic driving control device in FIG. 1.

In the automatic driving control processing in FIG. 4B, firstly, recognition processing of the external situations of the vehicle and the travelling state of the vehicle is performed (S14). This recognition processing is processing that recognizes the external situations of the vehicle such as a lane width of the road, a shape of the lane, a situation of another vehicle around the vehicle, and a situation of an obstacle around the vehicle, and recognizes the travelling state of the vehicle such as the vehicle speed of the vehicle. For example, the external situation recognition unit 11 recognizes the external situations of the vehicle based on the detection result of the external sensor 2 such as the camera and the radar. In addition, the travelling state recognition unit 13 recognizes the travelling state of the vehicle based on the detection result of the internal sensor 4 such as the vehicle speed sensor.

Then, the process proceeds to S16, and the generation of the short term travel plan is performed. The travel plan generation unit 14 generates the short term travel plan (target travel path and the target speed pattern) relating to the travelling of the vehicle from the current time to the time a few or a few tens of seconds ahead based on the external situation which is the surroundings information of the vehicle and the travelling state of the vehicle. The target travel path may be set on the position same as the reference travel trajectory. However, for example, in a case where an obstacle is present in the lane, there is a case where the target travel path is set on the position separated from the reference travel trajectory so as to avoid contact with the obstacle.

Then, the automatic driving control processing is performed. The automatic driving control processing is processing that executes the automatic driving control for causing the vehicle to travel in accordance with the target travel path. For example, the automatic driving control unit 15 outputs a control signal to the actuator 8 such that the vehicle travels in accordance with the target travel path, and then, executes the steering control, acceleration control, and brake control. At this time, if the target travel path is set on the center position of the lane in the width direction, the automatic driving control is performed such that the vehicle travels through the center position. On the other hand, if the target travel path is set on the position separated from the center position as a result of performing the steering by the driver during the automatic driving control, the automatic driving control is performed such that the vehicle travels through the position separated from the center position. When the processing in S16 ends, a series of control processing tasks in FIG. 4B ends.

Figure 5:
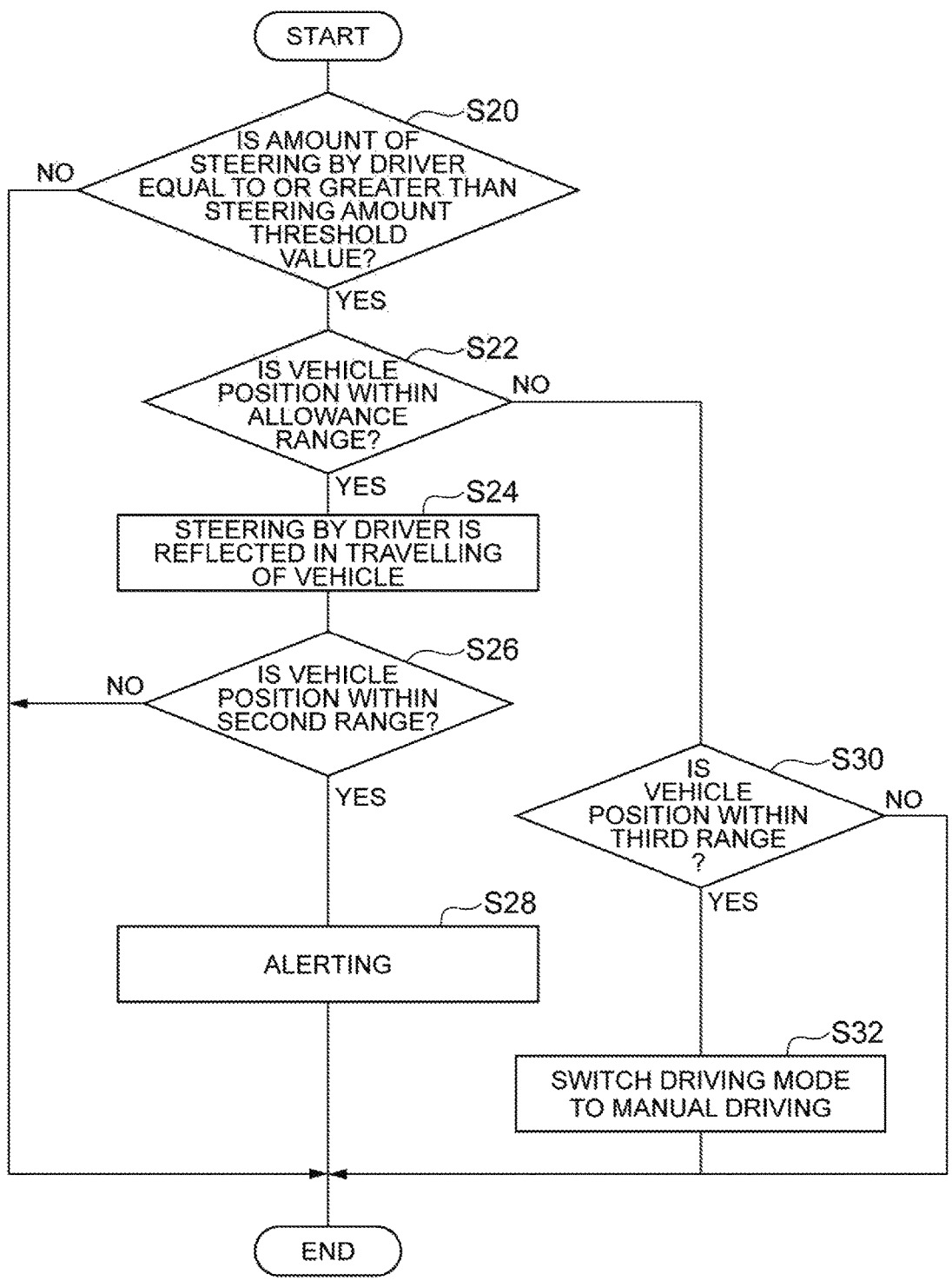
FIG. 5 is a flowchart illustrating alerting processing in the automatic driving control device in FIG. 1.

FIG. 5 is a flowchart illustrating alerting processing in the automatic driving control device 1 in the present embodiment. The alerting processing is processing that alerts the driver to the travelling of the vehicle when the steering by the driver is detected during the automatic driving control of the vehicle and the vehicle position becomes to be the second range due to the steering. The alerting processing in FIG. 5 starts with the starting of the automatic driving control and executed by the ECU 10.

In the alerting processing in FIG. 5, firstly, as illustrated in S20, it is determined whether or not the amount of steering by the driver is equal to or greater than the steering amount threshold value. This determination processing is processing that determines whether or not the steering by the driver is present during the automatic driving control. For example, the steering detection unit 16 determines whether or not the amount of steering by the driver during the automatic driving control is equal to or greater than the steering amount threshold value.

When it is determined that the amount of steering by the driver during the automatic driving control is not equal to or greater than the steering amount threshold value in S20, a series of control processing tasks in FIG. 5 ends. On the other hand, when it is determined that the amount of steering by the driver is equal to or greater than the steering amount threshold value in S20, it is determined whether or not the vehicle position is within the allowance range (S22). That is, the position determination unit 19 determines whether or not the position of the vehicle in the lane width direction is within the allowance range. The position determination unit 19 may determine whether or not the position of the vehicle in the lane width direction is within the allowance range based on whether or not the center position of the vehicle is included in the allowance range set in the lane. When it is determined that the position of the vehicle is within the allowance range in S22, the steering by the driver is reflected in the travelling of the vehicle (S24). This processing is processing that causes the steering by the driver to be reflected in the travelling of the vehicle even during the automatic driving control. For example, the automatic driving control unit 15 decreases the control torque in the automatic driving control and allows the vehicle to travel in accordance with the steering by the driver.

Then, the process proceeds to S26 and it is determined whether or not the vehicle position is within the second range. That is, the position determination unit 19 determines whether or not the position of the vehicle in the lane width direction is within the second range. The position determination unit 19 may determine whether or not the position of the vehicle in the lane width direction is within the second range based on whether or not the center position of the vehicle is included in the second range set in the lane.

In a case where it is determined that the vehicle position is within the second range in S26, the alerting processing is performed in S28. The alerting processing is processing that alerts the driver to the travelling of the vehicle. For example, the alerting unit 20 outputs the control signal to the display unit 21, sound output unit 22, and the vibration unit 23, causes the display unit 21, sound output unit 22, and the vibration unit 23, and then, alerts the driver to the travelling of the vehicle. At this time, all of the display unit 21, sound output unit 22, and the vibration unit 23 may be caused to operate, or a part thereof may be caused to operate. As the specific alerting, the alerting unit 20 outputs a voice to pay attention to the travelling of the vehicle or to check the direction of the vehicle from the speaker, displays marks of characters to pay attention to the travelling of the vehicle or to check the direction of the vehicle on the indicator or the monitor, or causes the light to be ON or to blink. On the other hand, When it is determined that the vehicle position is not within the second range in S26, a series of control processing tasks in FIG. 5 ends.

Incidentally, when it is determined that the vehicle position is not within the allowance range in S22, it is determined whether or not the vehicle position is within a third range (S30). That is, the position determination unit 19 determines whether or not the position of the vehicle in the lane width direction is within the third range. At this time, the position determination unit 19 may determine whether or not the position of the vehicle in the lane width direction is within the third range based on whether or not the center position of the vehicle is within the third range set in the lane.

When it is determined that the vehicle position is not within a third range in S30, a series of control processing tasks in FIG. 5 ends. On the other hand, when it is determined that the vehicle position is within a third range in S30, the driving mode switching processing to the manual driving is performed (S32). The driving mode switching processing to the manual driving is processing that switches the driving mode to the manual driving from the automatic driving. For example, a flag for switching to the manual driving or a flag for the manual driving is set in the ECU 10, and thus, the performing of switching the driving mode to the manual driving from the automatic driving can be recognized. In this case, the condition for ending the automatic driving control is satisfied and the automatic driving control ends. When the processing tasks in S28 and S32 end, a series of control processing tasks in FIG. 5 ends.

According to this alerting processing, when steering by the driver is detected during the automatic driving control of the vehicle and the vehicle position is within the second range due to the steering, alerting the driver to the travelling of the vehicle is performed. In this way, it is possible to cause the driver to recognize that it is necessary to pay attention to the travelling of the vehicle even during the automatic driving control is performed. As described above, since the safety in the travelling of the vehicle can be improved by alerting the driver, it is possible to expand the range of the travelling of the vehicle by the automatic driving control. Therefore, the travelling of the vehicle can be performed according to the intention of the driver.

In the alerting processing, when it is determined that the vehicle position is within third range in S30, the driving control for forcibly returning the vehicle position to the reference travel trajectory (for example, the center position in the lane) without performing the driving mode switching processing to the manual driving. For example, a, target lateral position of the vehicle is set on the position of the reference travel trajectory and the automatic driving control is performed such that the position of the vehicle approaches the target lateral position. At this time, the steering control is performed while the steering by the driver is not allowed. In addition, warning processing may be performed to the driver. The warning processing is processing that notifies the driver of the fact that the travelling of the vehicle is in an emergency state. For example, the alerting unit 20 outputs a control signal to the display unit 21, the sound output unit 22 and the vibration unit 23 to cause the display unit 21, the sound output unit 22 and the vibration unit 23 to operate, and notifies the driver of the fact that the travelling of the vehicle is in the emergency state. In this case, the alerting unit 20 increases a volume output from the speaker, increases the blinking speed of the indicator, or increases the vibration strength of the vibrator compared to those in the alerting processing described above.

In addition, in the alerting processing, when vehicle position approaches the third range, the alerting unit 20 may notify the driver of the fact that it is a time close to switching the driving mode by the steering before entering the third range. In this case, the driver can determine the amount of steering depending on how the driver wishes to change the driving state, and thus, the intention of the driver is easily reflected.

Figure 6:
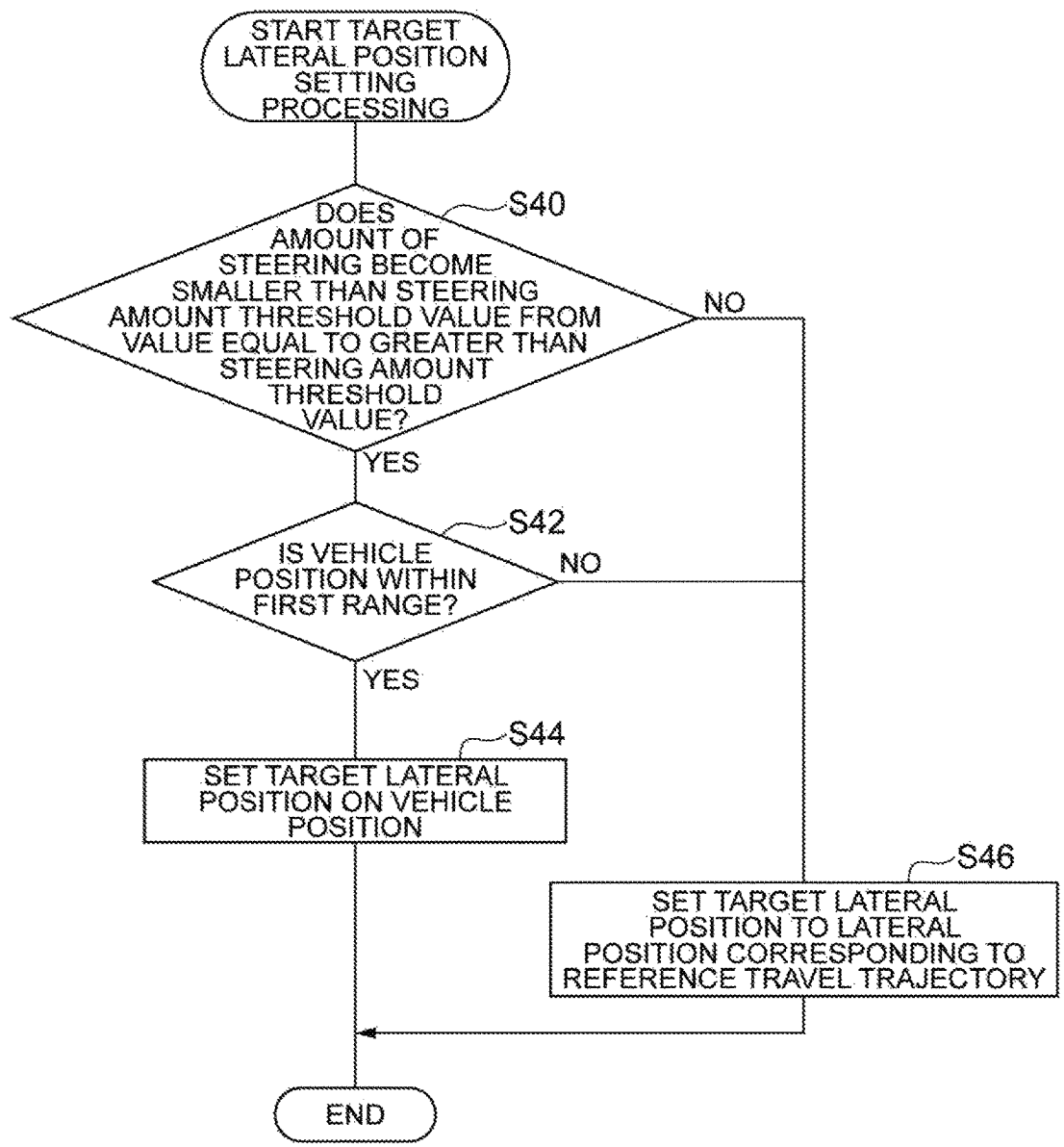
FIG. 6 is flowchart illustrating target lateral position setting processing in the automatic driving control device in FIG. 1.

FIG. 6 is flowchart illustrating target lateral position setting processing in the automatic driving control device 1 in the present embodiment. The target lateral position setting processing is processing that sets the target lateral position which is a target position in a vehicle width direction of the vehicle during the automatic driving control. The target travel path of the vehicle in the automatic driving control is determined in accordance with this target lateral position. The target lateral position setting processing in FIG. 6 starts with the starting of the automatic driving control and is executed by the ECU 10.

In the target lateral position setting processing in FIG. 6, firstly as illustrated in S40, it is determined whether or not the amount of steering by the driver becomes smaller than the steering amount threshold value after the amount of steering becomes equal to or greater than the steering amount threshold value. This determination processing is processing that determines whether or not the steering by the driver is present during the automatic driving control and the steering ends. That is, in order to set the target lateral position of the vehicle in accordance with the vehicle position at the time of ending the steering by the driver, the steering determination unit 17 determines that the steering by the driver is present and that the steering ends. In the determination processing in S40, for example, the steering determination unit 17 determines whether or not the amount of steering by the driver become smaller than the steering amount threshold value from value equal to greater than the steering amount threshold value.

When it is determined that the amount of steering by the driver becomes smaller than the steering amount threshold value after the amount of steering becomes equal to or greater than the steering amount threshold value in S40, it is determined whether or not the vehicle position is within the first range (S42). That is, the position determination unit 19 determines whether or not the position of the vehicle in the lane width direction is within the first range. At this time, the position determination unit 19 may determine whether or not the position of the vehicle in the lane width direction is within the first range based on whether or not the center position of the vehicle is included in the first range set in the lane.

When it is determined that the vehicle position is within the first range in S42, the target lateral position is set on the vehicle position (S44). That is, when the steering by the driver is present during the automatic driving control and the steering ends, and when the position of the vehicle in the vehicle width direction is within the first range, the travel plan generation unit 14 sets the position of the vehicle as the target lateral position of the vehicle. Therefore, when the steering by the driver is present during the automatic driving control and the vehicle position is within the first range and the steering ends, the automatic driving control is performed such that the vehicle position is maintained in this way, the driver can change the vehicle position by steering the steering wheel during the automatic driving control, and thus, the travelling of the vehicle according to the intention of the driver can be possible.

Incidentally, in a case where it is determined that the amount of steering by the driver does not become smaller than the steering amount threshold value after the amount of steering becomes equal to or greater than the steering amount threshold value in S40 and in a case where it is determined that the vehicle position is not within the first range in S42, the target lateral position is set on the position (for example, the center position in the lane) corresponding to the reference travel trajectory (S46). That is, in a case where the steering by the driver is not present during the automatic driving control, and in a case where the steering by the driver is present and the vehicle position is not within the first range in a case where the steering ends, the travel plan generation unit 14 sets the target lateral position on the position corresponding to the reference travel trajectory. That is, in these cases, the automatic driving control is performed such that the vehicle travels on the position corresponding to the reference travel trajectory. When the processing tasks in S44 and S46 end, a series of processing tasks in FIG. 6 ends.

According to the target lateral position setting processing, when the steering by the driver is present during the automatic driving control and the vehicle position is within the first range in a case where the steering ends, the automatic driving control is performed such that the vehicle position is maintained. Therefore, the driver can change the vehicle position in the first range by steering the steering wheel during the automatic driving control, and thus, the travelling of the vehicle according to the intention of the driver can be performed.

Next, a first modification example of the automatic driving control device 1 in the present embodiment will be described.

Figure 7:
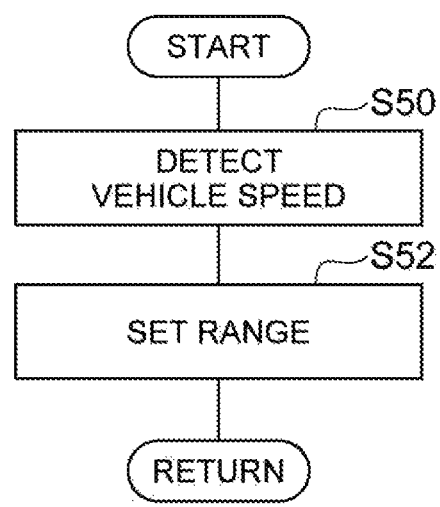
FIG. 7 is a flowchart illustrating range setting processing in a first modification example of the automatic driving control device in FIG. 1.

FIG. 7 is a flowchart illustrating range setting processing by the automatic driving control device 1 in the present modification example. This range setting processing is processing that sets the widths of the allowance range 80, the first range 81, and the second range 82 in FIG. 2 according to the vehicle speed of the vehicle. The control processing in FIG. 7 starts with the starting of the automatic driving control and is executed by the ECU 10.

First, as illustrated in S50, vehicle speed detection processing is performed. The vehicle speed detection processing is processing that detects the vehicle speed of the vehicle. For example, the travelling state recognition unit 13 recognizes the vehicle speed of the vehicle based on the vehicle speed information from the vehicle speed sensor of the internal sensor 4.

Then, the process proceeds to S52 and the range setting processing is performed. That is, the range setting unit 18 sets the allowance range 80, the first range 81, and the second range 82 based on the vehicle speed of the vehicle. At this time, the range setting unit 18 sets the allowance range 80, the first range 81, and the second range 82 to be wider in the lane as the vehicle speed becomes lower.

A degree of widths of the allowance range 80, the first range 81, and the second range 82 set according to the vehicle speed may be based on vehicle kinematics. First, ranges of friction circles used in the first range 81, the second range 82, and the third range 83 are defined. For example, the range of friction circle of the first range 81 which has a priority in riding comfort is defined to be within ±0.4G, the range of the friction circle of the second range 82 in which a bad riding comfort is allowed is defined to be ±0.7G, and the range of the friction circle of the third range 83 which is a range close to the friction circle limit is defined as 1G. Here, in a usual steering wheel operation by the driver, it is assumed that a fluctuation of the vehicle in the right and left direction is generated in a form of a sine wave. For example, assuming by the frequency of the fluctuation, a vehicle motion trajectory due to the fluctuation is derived by following Equation (1).

$$f(t) = X \cdot \sin(\omega \cdot t) \quad (1)$$

In Equation (1), $\omega$ represents an angular frequency and t represents a time point. X represents amplitude, and half the width of the first range 81 is corresponding to X, half the distance between the right and left end portions of the second range 82 is corresponding to X, and half the distance between the right and left end portions of the third range 83 is corresponding to X. If a turning radius in each time point t in the sine wave f(t) is assumed to be R(t) and the current vehicle speed is assumed to be V, the maximum lateral acceleration a(t) is expressed as Equation (2).

$$a(t) = V^2 / R(t) \quad (2)$$

In Equation (2), by substituting each number for the defined G range, the vehicle V, the frequency of the fluctuation $\omega$ respectively, the width of the first range 81, the distance between the right and left end portions of the second range 82, and the distance between the right and left end portions of the third range 83 can be determined. In this way, it is possible to appropriately set the width of the first range 81, the second range 82, and the allowance range 80. When the processing in S52 ends, a series of control processing tasks in FIG. 7 ends.

According to this range setting processing, the allowance range, the first range, and the second range are set according to the vehicle speed of the vehicle, and the allowance range, the first range, and the second range are set to be wider in the lane as the vehicle speed becomes lower. Therefore, it is possible to widen the ranges of reflecting the steering by the driver in the travelling of the vehicle while considering the vehicle speed of the vehicle compared to a case where the allowance range, the first range, and the second range are set to be fixed ranges. In addition, since the widths of the allowance range, the first range, and the second range are set from the view point of the vehicle kinematics, ranges suitable for the travelling of the vehicle can be set. Therefore, it is possible to suppress the uncomfortable feeling to driver in travelling of the vehicle.

Next, a second modification example of the automatic driving control device 1 in the present embodiment will be described.

Figure 8:
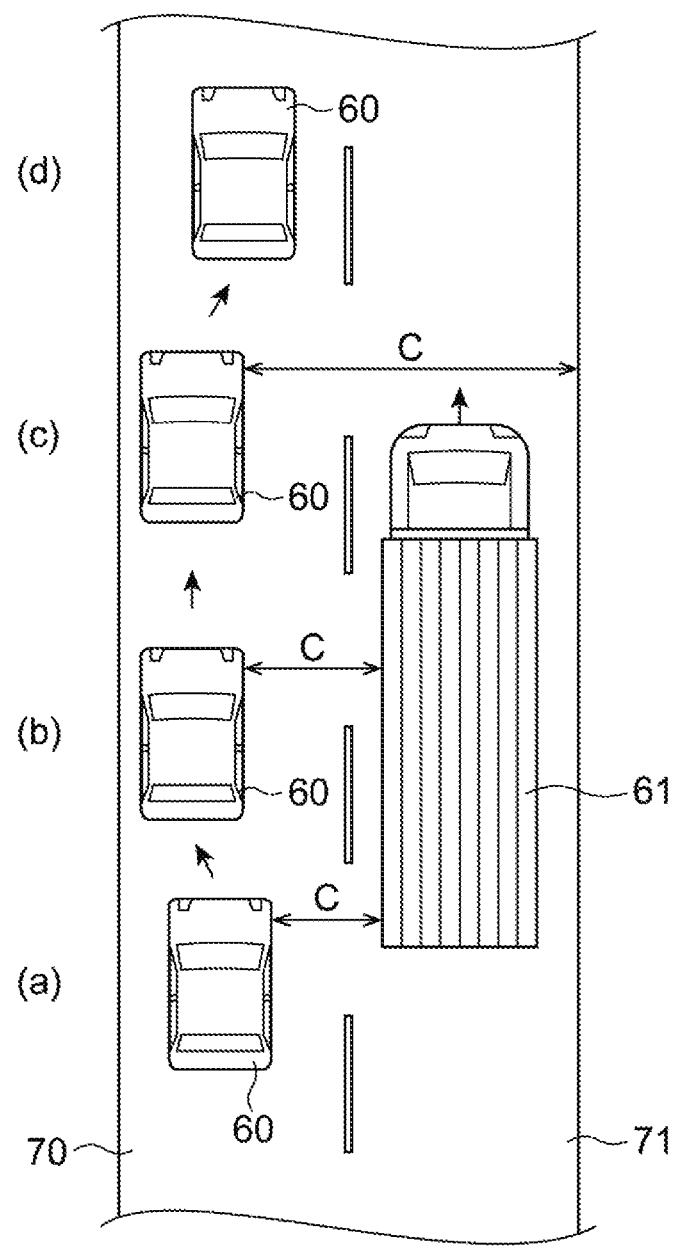
FIG. 8 is diagram for describing a vehicle travelling in a second modification example of the automatic driving control device in FIG. 1.

FIG. 8 is diagram for describing a vehicle travelling of the automatic driving control device 1 in the present modification example during the automatic driving control. When the steering by the driver is present during the automatic driving control and the steering is performed in order to be away from another vehicle 61 travelling in parallel in an adjacent lane 71, the automatic driving control device 1 in be present modification example performs the automatic driving control such that the vehicle position changed by the steering is maintained during the parallel travelling with another vehicle 61 and such that the vehicle position is returned to the position on the reference travel trajectory 85 when the state of parallel travelling with another vehicle 61 continues no longer.

Figure 9:
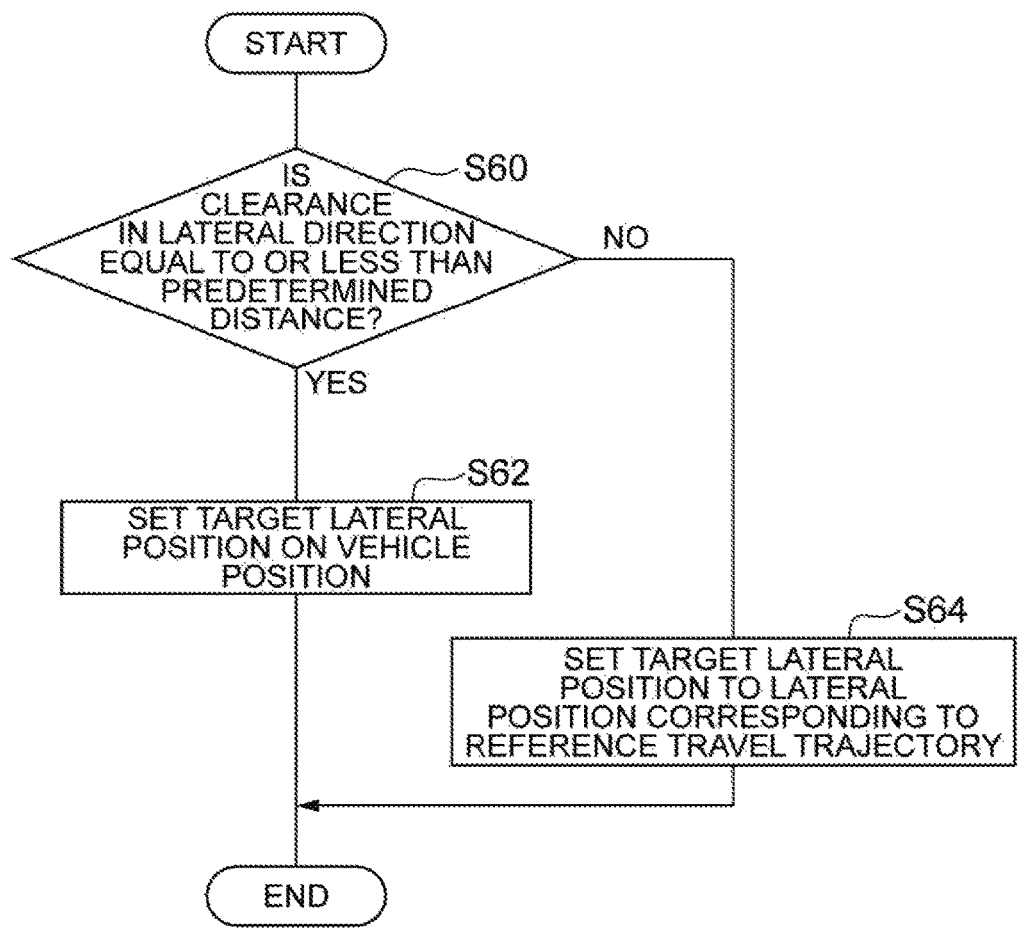
FIG. 9 is a flowchart illustrating target lateral position setting processing in the second modification example of the automatic driving control device in FIG. 1.

FIG. 9 is a flowchart illustrating target lateral position setting processing by the automatic driving control device 1 in the present modification example. This target lateral position setting processing is processing that sets the target lateral position which is a target position in the vehicle width direction of the vehicle during the automatic driving control. The target lateral position setting processing in FIG. 9 is executed by the ECU 10 when the steering by the driver is performed during the automatic driving control and the vehicle position becomes the first range or the second range and another vehicle 61 is detected from any of the right or left sides of the vehicle 60.

First, as illustrated in S60 in FIG. 9, it is determined whether or not a clearance in the lateral direction of the vehicle is equal to or less than the predetermined distance. For example, the external situation recognition unit 11 determines whether or not the distance between the vehicle 60 and another vehicle 61 traveling in the lateral side of the vehicle 60, that is, the clearance is equal to or less than a predetermined distance. A distance value set in the ECU 10 is used as the predetermined distance.

Here, (a) of FIG. 8 illustrates the vehicle 60 that changes the position of the vehicle 60 by the steering by the driver in order to be away from another vehicle 61. (b) of FIG. 8 illustrates a state of travelling in parallel to another vehicle 61. At this time, the clearance C to another vehicle 61 is equal to or less than the predetermined distance. In (c) of FIG. 8, the state of travelling parallel with another vehicle 61 is released and the clearance C to another vehicle 61 is not equal to or less than the predetermined distance. In (d) of FIG. 8, by the state of travelling parallel with another vehicle 61 being released, the automatic driving control is performed such that the lateral position of the vehicle 60 becomes the position of the reference travel trajectory 85 at the center of the lane.

When it is determined that the clearance C in the lateral direction of the vehicle 60 is equal to or less than the predetermined distance in S60 in FIG. 9, the target lateral position is set on the vehicle position (S62). That is, when the steering by the driver is present during the automatic driving control and the clearance C to another, vehicle 61 is equal to or less than the predetermined distance, the travel plan generation unit 14 determines that the vehicle 60 is travelling in parallel with the another vehicle 61 and sets the current position of the vehicle 60 as the target lateral position. Therefore, the automatic driving control is performed such that the current vehicle position is maintained. In this way, the driving control in accordance with the driver's intention of trying to drive the vehicle 60 at the position away from another vehicle 61.

On the other hand, when it is determined that the clearance C in the lateral direction of the vehicle 60 is not equal to or less than the predetermined distance in S60, the target lateral position is set on the position corresponding to the reference travel, trajectory (S64). That is, when the clearance C to another vehicle 61 is not equal to or less than the predetermined distance, the travel plan generation unit 14 determines that the state of travelling parallel with another vehicle 61 is released, and sets the position corresponding to the reference travel trajectory as the target lateral position. In this way, the automatic driving control is performed on the vehicle 60 so as to travel on the position corresponding to the reference travel trajectory, for example, on the center position in the lane. When the processing tasks in S62 and S64 end, a series of control processing tasks in FIG. 9 ends.

According to this target lateral position setting processing, when the driver performs the steering during the automatic driving control in order to be away from another vehicle travelling on the lateral side of the vehicle, it is possible to cause the vehicle to travel while maintaining the vehicle position during the parallel travelling with another vehicle, and when the state of travelling parallel with another vehicle is released, it is possible to return the vehicle position to the position corresponding to the reference travel trajectory.

Next, a third modification example of the automatic driving control device 1 in the present embodiment will be described.

Figure 10:
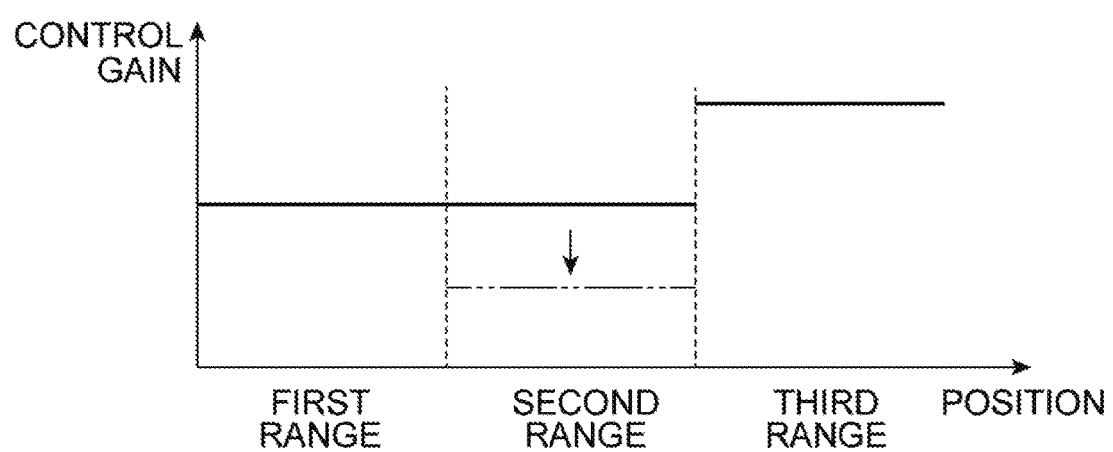
FIG. 10 is a diagram for describing a control gain in a third modification example of the automatic driving control device in FIG. 1.

FIG. 10 is a diagram for describing a state of a control gain in the automatic driving control device 1 in the present modification example. The control gain in FIG. 10 is a control gain used for making the position of the vehicle to be the target lateral position. As the control gain increases, the speed toward the target lateral position becomes high. In the solid line in FIG. 10, the control gains in the first range and the second range are the same, and the control gain in the third range is set to be high. In this case, when the vehicle position is within the third range, the amount of steering control becomes large and the speed toward the target lateral position becomes high.

Here, as illustrated in two-dot chain line in the second range, lowering the control gain according to the control state of the vehicle is illustrated. In this case, as the control gain decreases, the control torque decreases, and in a case where the driver performs the steering, it is possible to perform the operation of the steering wheel without feeling a big reaction force. In this way, the travelling of the vehicle intended by the driver can easily be realized. In addition, the control gain may not be discretely set as in between the second range and the third range in FIG. 10, and may be set so as to have continuity between the ranges.

Next, a fourth modification example of the automatic driving control device 1 in the present embodiment will be described.

Figure 11:
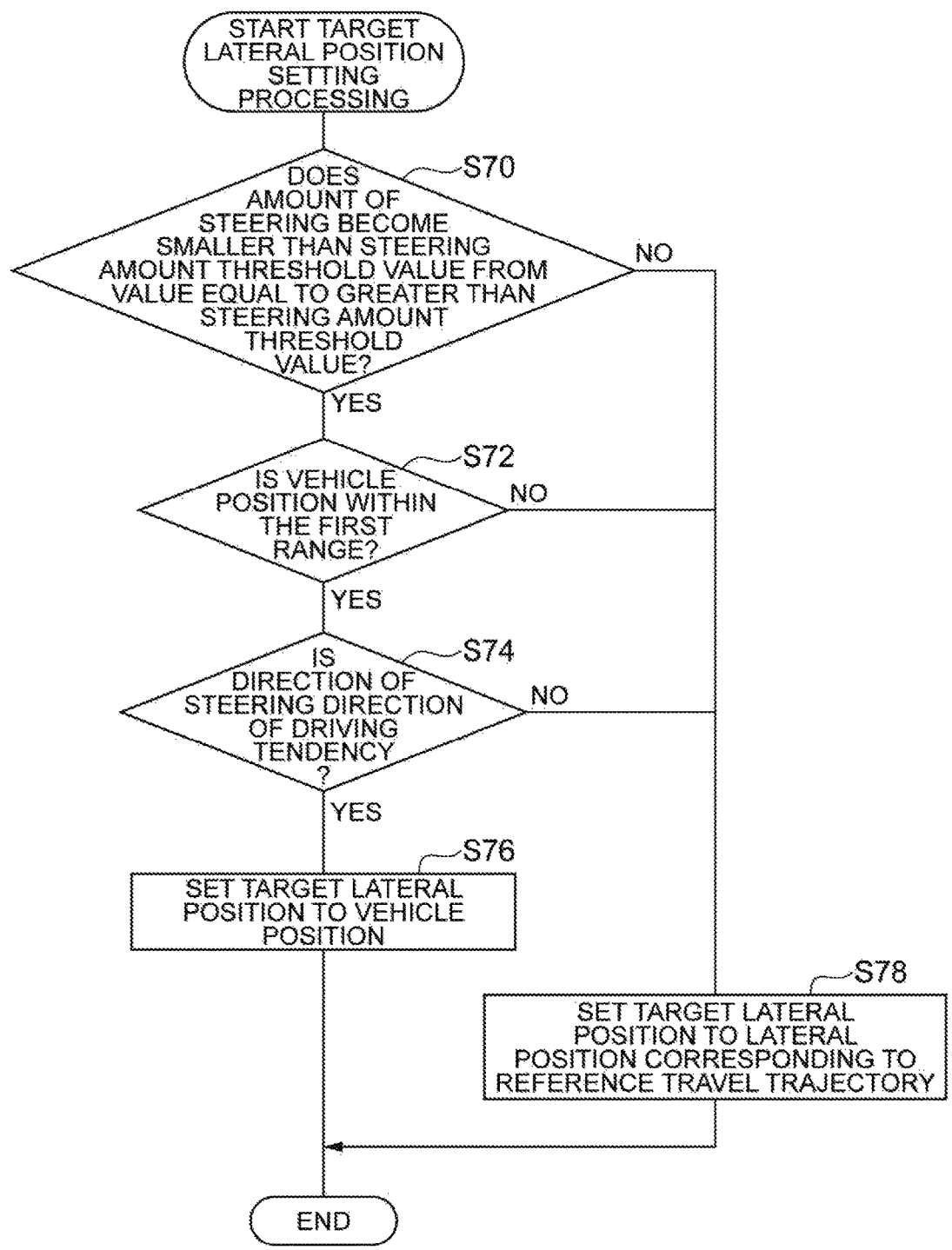
FIG. 11 is a flowchart illustrating target lateral position setting processing in a fourth modification example of the automatic driving control device in FIG. 1.

FIG. 11 is a flowchart illustrating target lateral position setting processing by the automatic driving control device 1 in the present modification example. The automatic driving control device 1 in the present modification example is a device that sets the target lateral position of the vehicle while considering the driving tendency of the driver and performs the automatic driving control according to the target lateral position in a case were the steering by the driver is detected during the automatic driving control. The target lateral position setting processing in FIG. 11 is processing that sets the target lateral position which is a target position in the vehicle width direction of the vehicle during the automatic driving control, and starts with the starting of the automatic driving control and executed by the ECU 10.

First, as illustrated in S70, it is determined whether or not the amount of steering by the driver becomes smaller than the steering amount threshold value after the amount of steering becomes equal to or greater than the steering amount threshold value. This determination processing is processing that determines whether or not the steering by the driver is present during the automatic driving control and the steering ends. That is, in order to set the target lateral position of the vehicle in accordance with the vehicle position at the time of the steering by the driver, it is determined that the steering by the driver is present and the steering ends. In the determination processing in S70, for example, the steering determination unit 17 determines whether or not the amount of steering decreases to an amount smaller than the steering amount threshold value from the amount equal to or greater than the steering amount threshold value. For example, a steering angle or a steering torque of the steering wheel is used as the amount of steering. In addition, a set value set in the ECU 10 may be used as the steering amount threshold value.

When it is determined that the amount of steering by the driver becomes smaller than the steering amount threshold value after the amount of steering becomes equal to or greater than the steering amount threshold value in S70, it is determined whether or not the vehicle position is within the first range (S72). That is, the position determination unit 19 determines whether or not the position of the vehicle in the lane width direction is within the first range. At this time, it may be determined whether or not the position of the vehicle in the lane width direction is within first range based on whether or not the center position of the vehicle is included in the first range set in the lane.

When it is determined that the vehicle position is within the first range in S72, it is determined whether or not the direction of the steering by the driver is the direction of the driving tendency of the driver (S74). The direction of the driving tendency is a tendency direction in the usual driving by the driver, and may be acquired from, for example, past driving history data. When it is determined that the direction of the steering by the driver is the direction of the driving tendency of the driver in S74, the target lateral position is set to vehicle position (S76). That is, when the position of the vehicle in the vehicle width direction is within the first range, the steering by the driver is present during the automatic driving control and the steering direction is the direction of the driving tendency of the driver, the travel plan generation unit 14 sets the position of the vehicle as the target lateral position of the vehicle. In this case, it is determined that the driver intentionally changes the vehicle position during the automatic driving control in order to perform the driving in his/her own preferences, and thus, the automatic driving control is performed such that the vehicle position is maintained. In this way, the vehicle position can be changed by the driver steering the steering wheel during the automatic driving control, and thus, the travelling of the vehicle in accordance with the intention of the driver becomes possible.

Incidentally, in a case where it is determined that the amount of steering by the driver does not become smaller than the steering amount threshold value after the amount of steering becomes equal to or greater than the steering amount threshold value in S70, in a case where it is determined that the vehicle position is not within the first range in S72, and in a case where it is determined that the direction of the steering by the driver is not the direction of the driving tendency of the driver in S74, the target lateral position is set to the position corresponding to the reference travel trajectory (S78). That is, the travel plan generation unit 14 sets the target lateral position to the position corresponding to the reference travel trajectory. In this way, the automatic driving control is performed such that the vehicle travels on the position corresponding to the reference travel trajectory (for example, the center position in the lane). When the processing tasks in S76 and S78 end, a series of control processing tasks in FIG. 11 ends.

According to this target lateral position setting processing, when the steering by the driver is present during the automatic driving control and the direction of the driving is the driving tendency of the driver, the automatic driving control is performed while the vehicle position is maintained. In this way, the travelling of the vehicle can be performed along the intention of the driver.

Next, a fifth modification example of the automatic driving control device 1 in the present embodiment will be described.

Figure 12:
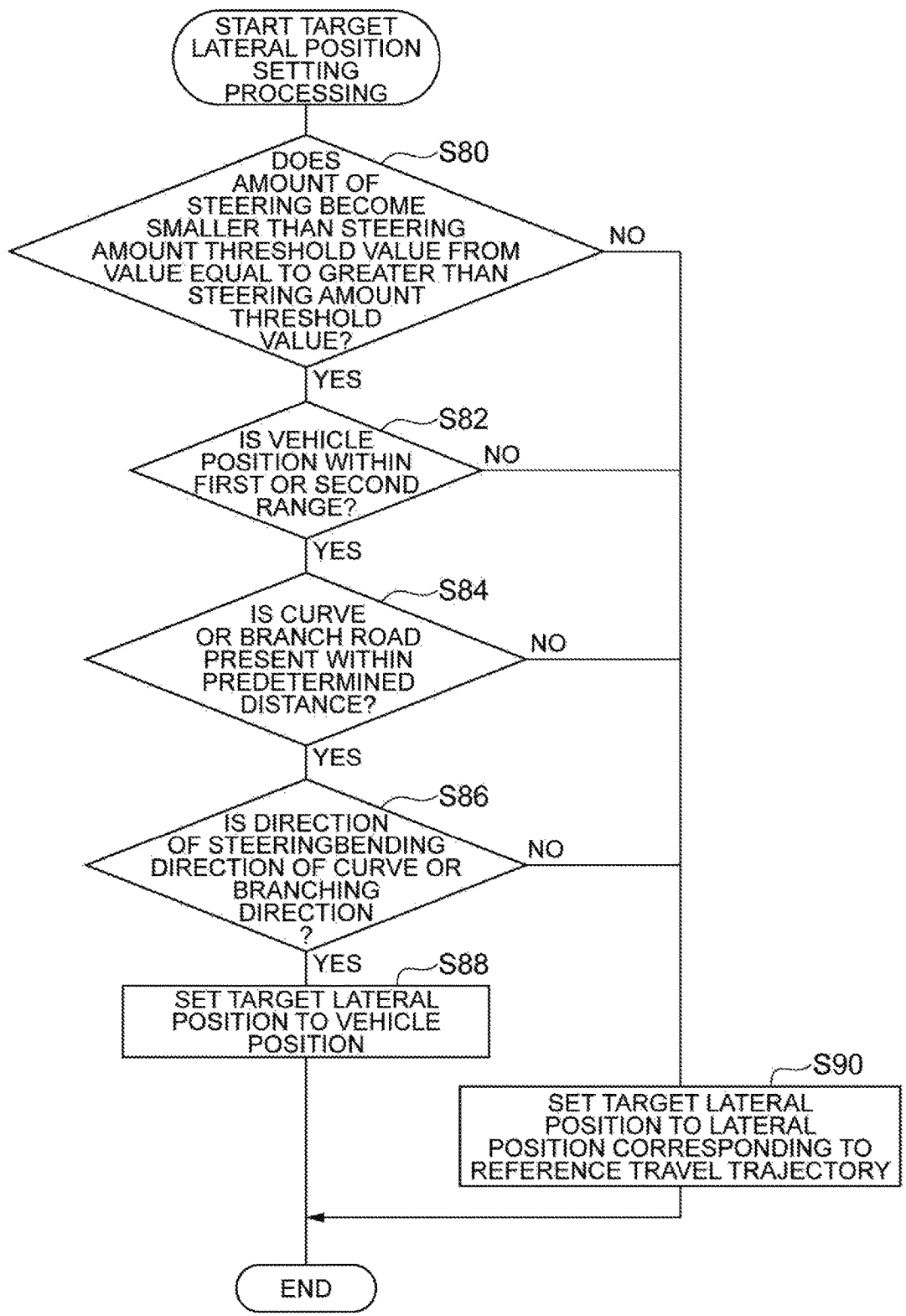
FIG. 12 is a flowchart illustrating target lateral position setting processing in a fifth modification example of the automatic driving control device in FIG. 1.

FIG. 12 is a flowchart illustrating target lateral position setting processing by the automatic driving control device 1 in the present modification example. The automatic driving control device 1 in the present modification example is a device that sets the target lateral position of the vehicle while considering the shapes of the road such as a curve of the road or a branch road and performs the automatic driving control according to the target lateral position in a case were the steering by the driver is detected during the automatic driving control. The target lateral position setting processing in FIG. 12 is processing that sets the target lateral position which is a target position in the vehicle width direction of the vehicle during the automatic driving control, and starts with the starting of the automatic driving control and executed by the ECU 10.

First, as illustrated in S80, it is determined whether or not the amount of steering by the driver becomes smaller than the steering amount threshold value after the amount of steering becomes equal to or greater than the steering amount threshold value. When it is determined that the amount of steering by the driver becomes smaller than the steering amount threshold value after the amount of steering becomes equal to or greater than the steering amount threshold value in S80, it is determined whether or not the vehicle position is within the first range or the second range (S82). That is the position determination unit 19 determines whether or not the position of the vehicle in the lane width direction is within the first range or the second range. At this time, it may be determined whether or not the position of the vehicle in the lane width direction is within the first range or the second range based on whether or not the center position of the vehicle is included in the first range or the second range.

When it is determined that the vehicle position is within the first range or the second range in S82, it is determined whether or not the curve or the branch road is present within a predetermined distance from the vehicle (S84). This determination is performed based on, for example, the road information in the map database 6. When it is determined that the curve or the branch road is present within a predetermined distance from the vehicle in S84, it is determined whether or not the direction of the steering by the driver is the bending direction of the curve or the branching direction of the branch road (S86). When it is determined that the direction of the steering by the driver is the bending direction of the curve or the branching direction of the branch road in S86, the target lateral position is set to the vehicle position (S88). That is, the travel plan generation unit 14 sets the current position of the vehicle as the target lateral position of the vehicle. In this case, it is determined that the driver intentionally changes the vehicle position during the automatic driving control according to the curve or the branch road, and thus, the automatic driving control is performed such that the vehicle position is maintained. In this way, the vehicle position can be changed by the driver steering the steering wheel during the automatic driving control, and thus, the travelling of the vehicle in accordance with the intention of the driver becomes possible.

Incidentally, in a case where it is determined that the amount of steering by the driver does not become smaller than the steering amount threshold value after the amount of steering becomes equal to or greater than the steering amount threshold value in S80, in a case where it is determined that the vehicle position is not within the first range and the second range in S82, in a case where it is determined that the curve and the branch road is not present within a predetermined distance from the vehicle in S84, and in a case where it is determined that the direction of the steering by the driver is not the bending direction of the curve or the branching direction of the branch road in S86, the target lateral position is set to a position corresponding to the reference travel trajectory (S90). That is, the travel plan generation unit 14 sets the target lateral position to the position corresponding to the reference travel trajectory. In this way, the automatic driving control is performed such that the vehicle travels on the position corresponding to the reference travel trajectory (for example, the center position in the lane). When the processing tasks in S88 and S90 end, a series of control processing tasks in FIG. 12 ends.

According to this target lateral position setting processing, when the steering by the driver is present during the automatic driving control and the direction of the steering is the bending direction of the curve or the branching direction of the branch road, the automatic driving control is performed while the vehicle position is maintained. In this way, the travelling of the vehicle can be performed along the intention of the driver.

Next, a sixth modification example of the automatic driving control device 1 in the present embodiment will be described.

Figure 13:
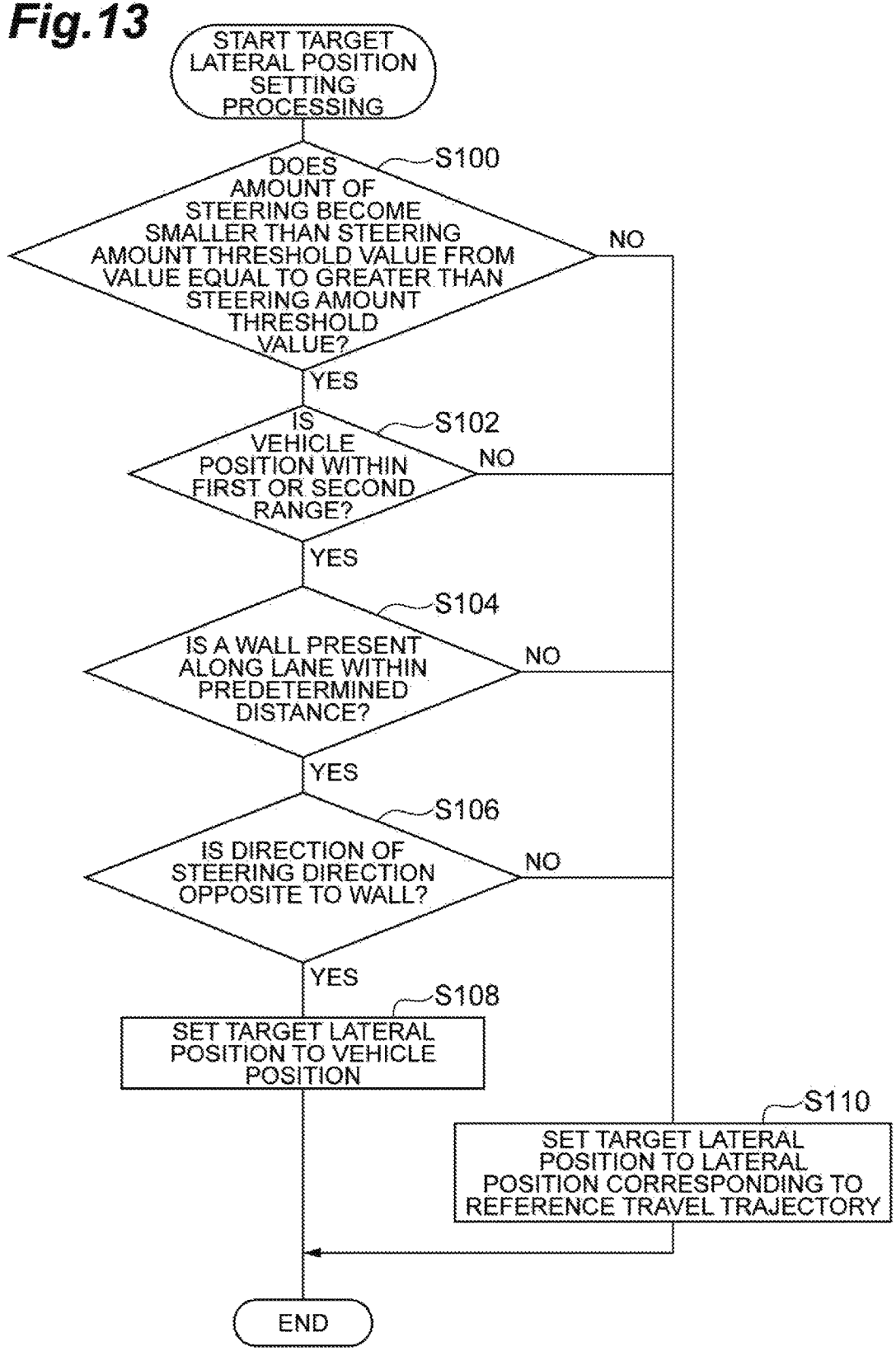
FIG. 13 is a flowchart illustrating target lateral position setting processing in a sixth modification example of the automatic driving control device in FIG. 1.

FIG. 13 is a flowchart illustrating target lateral position setting processing by the automatic driving control device 1 in the present modification example. The automatic driving control device 1 in the present modification example is a device that sets the target lateral position of the vehicle while considering structures that exit along the lane and performs the automatic driving control according to the target lateral position in a case were the steering by the driver is detected during the automatic driving control. The target lateral position setting processing in FIG. 13 is processing that sets the target lateral position which is a target position in the vehicle width direction of the vehicle during the automatic driving control, and starts with the starting of the automatic driving control and executed by the ECU 10.

First, as illustrated in S100, it is determined whether or not the amount of steering by the driver becomes smaller than the steering amount threshold value after the amount of steering becomes equal to or greater than the steering amount threshold value. When it is determined that the amount of steering by the driver becomes smaller than the steering amount threshold value after the amount of steering becomes equal to or greater than the steering amount threshold value in S100, it is determined whether or not the vehicle position is within the first range or the second range (S102). That is, the position determination unit 19 determines whether or not the position of the vehicle in the lane width direction is within the first range or the second range. At this time, it may be determined whether or not the position of the vehicle in the lane width direction is within the first range or the second range based on whether or not the center position of the vehicle is included in the first range or the second range.

When it is determined that the vehicle position is within the first range or the second range in S102, it is determined whether or not a wall is present along the lane within a predetermined distance from the vehicle (S104). This determination may be performed based on, for example, the road information in the map database 6. When it is determined that the wall is present along the lane within a predetermined distance from the vehicle in S104, it is determined whether or not the direction of the steering by the driver is a direction opposite to the wall direction (S106). When it is determined that the direction of the steering by the driver is the direction opposite to the wall direction in S106, the target lateral position is set to the vehicle position (S108). That is, the travel plan generation unit 14 sets the current position of the vehicle as the target lateral position of the vehicle. In this case, it is determined that the driver intentionally changes the vehicle position during the automatic driving control so as to be away from the wall, and thus, the automatic driving control is performed such that the vehicle position is maintained. In this way, the travelling of the vehicle in accordance with the intention of the driver becomes possible.

Incidentally, in a case where it is determined that the amount of steering by the driver does not become smaller than the steering amount threshold value after the amount of steering becomes equal to or greater than the steering amount threshold value in S100, in a case where it is determined that the vehicle position is not within the first range and the second range in S102, in a case where it is determined that the wall is not present along the lane within a predetermined distance from the vehicle in S104, and in a case where it is determined that the direction of the steering by the driver is not the direction opposite to the wall direction in S106, the target lateral position is set to the position corresponding to the reference travel trajectory (S110). That is, the travel plan generation unit 14 sets the target lateral position to the position corresponding to the reference travel trajectory. In this way, the automatic driving control is performed such that the vehicle travels on the position corresponding to the reference travel trajectory (for example, the center position in the lane). When the processing tasks in S108 and S110 end, a series of control processing tasks in FIG. 13 ends.

According to this target lateral position setting processing, when the steering by the driver is present during the automatic driving control and the direction of the steering is the direction opposite to the wall direction, the automatic driving control is performed while the vehicle position is maintained. In this way, the travelling of the vehicle can be performed along the intention of the driver. In the present modification example, a case where the wall is present along the lane is described. However, the description may be applied to another structure.

Next, a sixth modification example of the automatic driving control device 1 in the present embodiment will be described.

Figure 14:
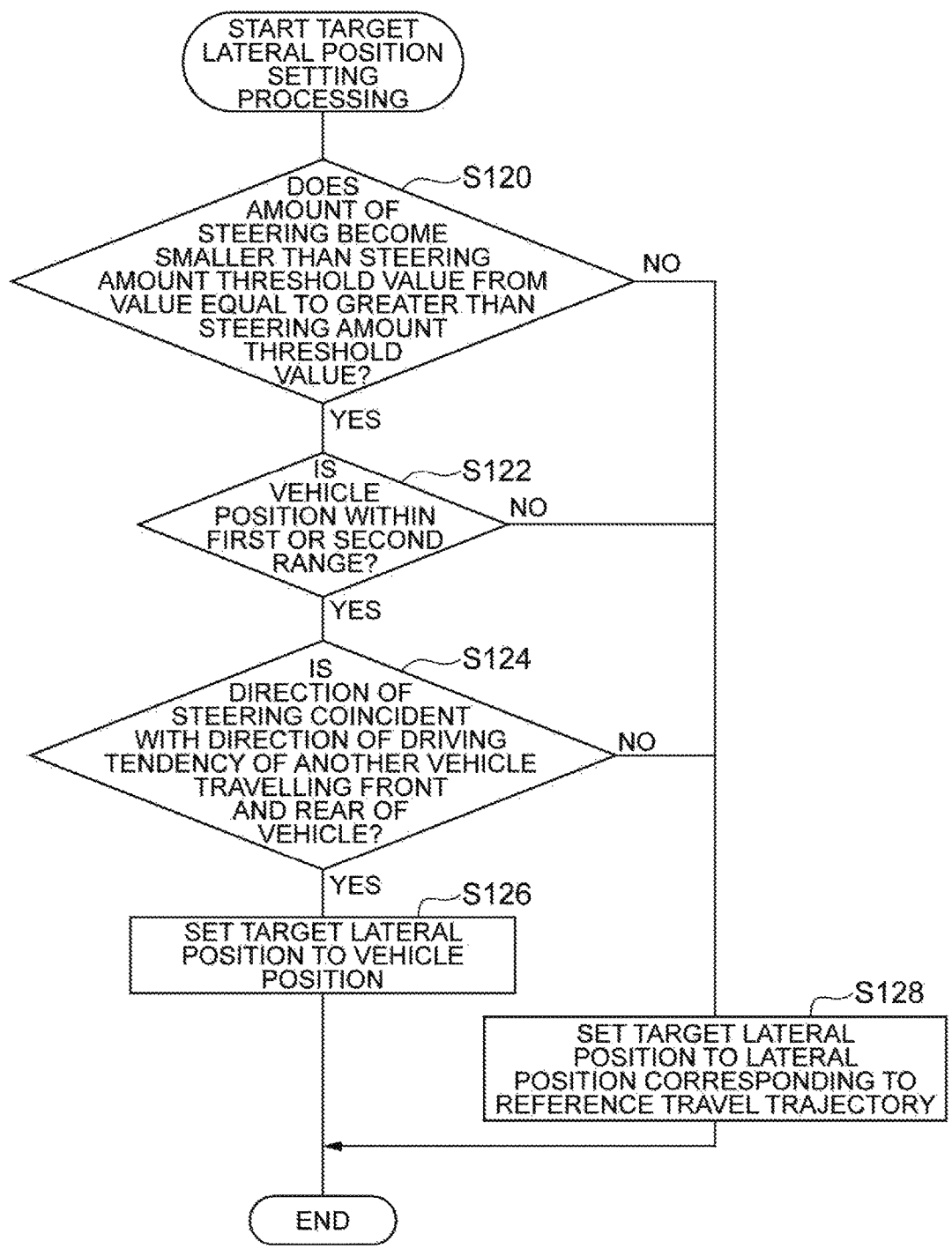
FIG. 14 is a flowchart illustrating target lateral position setting processing in a seventh modification example of the automatic driving control device in FIG. 1.

FIG. 14 is a flowchart illustrating target lateral position setting processing by the automatic driving control device 1 in the present modification example. The automatic driving control device 1 in the present modification example is a device that sets the target lateral position of the vehicle while considering driving tendencies of other vehicles travelling front and rear of the vehicle in the same lane, and performs the automatic driving control according to the target lateral position in a case were the steering by the driver is detected during the automatic driving control. The target lateral position setting processing in FIG. 14 is processing that sets the target lateral position which is a target position in the vehicle width direction of the vehicle during the automatic driving control, and starts with the starting of the automatic driving control and executed by the ECU 10.

First, as illustrated in S120, it is determined whether or not the amount of steering by the driver becomes smaller than the steering amount threshold value after the amount of steering becomes equal to or greater than the steering amount threshold value. When it is determined that the amount of steering by the driver becomes smaller than the steering amount threshold value after the amount of steering becomes equal to or greater than the steering amount threshold value in S120, it is determined whether or not the vehicle position is within the first range or the second range (S122). That is, the position determination unit 19 determines whether or not the position of the vehicle in the lane width direction is within the first range or the second range. At this time, it may be determined whether or not the position of the vehicle in the lane width direction is within the first range or the second range based on whether or not the center position of the vehicle is included in the first range or the second range.

When it is determined that the vehicle position is within the first range or the second range in S122, it is determined whether or not the direction of the steering by the driver is coincident with a direction of the driving tendency of another vehicle travelling in the same lane (S124). Information on the direction of the driving tendency may be acquired by, for example, a (not illustrated) communication unit. When it is determined that the direction of the steering by the driver is coincident with a direction of the driving tendency of another vehicle travelling in the same lane in S124, the target lateral position is set to the vehicle position (S126). That is, the travel plan generation unit 14 sets the current position of the vehicle as the target lateral position of the vehicle. In this case, it is determined that the driver intentionally changes the vehicle position during the automatic driving control such that the driving matches the driving of another vehicle, and thus, the automatic driving control is performed such that the vehicle position is maintained. In this way, the travelling of the vehicle in accordance with the intention of the driver becomes possible.

Incidentally, in a case where it is determined that the amount of steering by the driver does not become smaller than the steering amount threshold value after the amount of steering becomes equal to or greater than the steering amount threshold value in S120, in a case where it is determined that the vehicle position is not within the first range and the second range in S122, and in a case where it is determined that the direction of the steering by the driver is not coincident with the direction of the driving tendency of another vehicle travelling in the same lane in S124, the target lateral position is set to the position corresponding to the reference travel trajectory (S128). That is, the travel plan generation unit 14 sets the target lateral position to the position corresponding to the reference travel trajectory. In this way, the automatic driving control is performed such that the vehicle travels on the position corresponding to the reference travel trajectory (for example, the center position in the lane). When the processing tasks in S126 and S128 end, a series of control processing tasks in FIG. 14 ends.

According to this target lateral position setting processing, when the steering by the driver is present during the automatic driving control and the direction of the steering is coincident with the direction of the driving tendency of another vehicle, the automatic driving control is performed while the vehicle position is maintained. In this way, the travelling of the vehicle can be performed along the intention of the driver.

As described above, according to the automatic driving control device 1 in the present embodiment, even during the automatic driving control, when the position of the vehicle in the lane width direction is included in the allowance range, the steering by the driver is reflected in the travelling of the vehicle. Therefore, the travelling of the vehicle along the intention of the driver can be realized, and when the vehicle is largely away from the reference travel trajectory and reaches the second range, it is possible to alert the driver to the travelling of the vehicle. Therefore, by alerting the driver, it is possible to set the allowance range for the automatic driving control to be wide.

In addition, in the automatic driving control device 1 in the present embodiment, in a case where the amount of steering by the driver becomes smaller than the steering amount threshold value after the amount of steering by the driver becomes equal to or greater than the steering amount threshold value and the position of the vehicle in the lane width direction is changed, when the position of the vehicle in the lane width direction is included in the first range, the automatic driving control is executed such that the position of the vehicle in the lane width direction is maintained. Therefore, it is possible to cause the vehicle to travel on the position of the driver's intention.

In addition, in the automatic driving control device 1 in the present embodiment, by setting the allowance range, the first range, and the second range to be wider in the lane as the vehicle speed becomes lower, it is possible to widen the range of reflecting the steering by the driver in the travelling of the vehicle compared to the case where the allowance range, the first range, and the second range are fixed ranges while considering the vehicle speed of the vehicle.

In the embodiment described above, one embodiment of the automatic driving control device in the present invention is described. However, the automatic driving control device in the present invention is not limited to the embodiment described above. The automatic driving control device in the present invention may be an apparatus in which the automatic driving control device in the embodiment described above is modified without changing the gist set forth in each aspect of the invention, or may be an apparatus applied to others.

What is claimed is:

1. An automatic driving control device configured to perform an automatic driving control for causing a vehicle to travel along a reference travel trajectory set in a lane in advance, the automatic driving control device comprising:
   a steering detection unit configured to detect a steering by a driver of the vehicle during the automatic driving control;
   a range setting unit configured to set an allowance range that includes the reference travel trajectory in the lane as a range in a lane width direction of the lane, and to set a first range that includes the reference travel trajectory in the allowance range and a second range at both the right and left sides of the first range;
   an automatic driving control unit configured to execute the automatic driving control and to apply the steering by the driver during the automatic driving control in the travelling of the vehicle when the steering by the driver is detected by the steering detection unit and a position of the vehicle in the lane width direction is included in the allowance range;
   a position determination unit configured to determine whether or not the position of the vehicle in the lane width direction is included in the second range when the steering by the driver is detected by the steering detection unit;
   an alerting unit configured to alert the driver to the travelling of the vehicle when it is determined by the position determination unit that the position of the vehicle in the lane width direction is included in the second range; and
   a vehicle speed detection unit configured to detect a vehicle speed of the vehicle,
   wherein the range setting unit is configured to set the allowance range, the first range, and the second range based on the vehicle speed of the vehicle, and to set the allowance range, the first range, and the second range to be wider in the lane as the vehicle speed becomes lower.

2. The automatic driving control device according to claim 1, further comprising:
   a steering determination unit configured to determine whether or not an amount of steering by the driver detected by the steering detection unit decreases to an amount smaller than a steering amount threshold value from an amount equal to or greater than the steering amount threshold value,
   wherein the position determination unit is configured to determine whether or not a position of the vehicle in the lane width direction is included in the first range, and
   wherein, the automatic driving control unit is configured to execute the automatic driving control such that the position of the vehicle in the lane width direction is maintained when it is determined by the steering determination unit that the amount of steering by the driver decreases to the amount smaller than the steering amount threshold value from the amount equal to or greater than the steering amount threshold value and it is determined by the position determination unit that the position of the vehicle in the lane width direction is included in the first range.

* * * * *